(No Model.) 2 Sheets—Sheet 1.

J. P. MAHER.
RAILWAY CAR.

No. 251,787. Patented Jan. 3, 1882.

Witnesses
Frank P Kinsey
Samuel T. P. Kinsey

Inventor
John P. Maher
pr Thomas P Kinsey
Atty (No Model.) 2 Sheets—Sheet 2.
J. P. MAHER.
RAILWAY CAR.
No. 251,787. Patented Jan. 3, 1882.
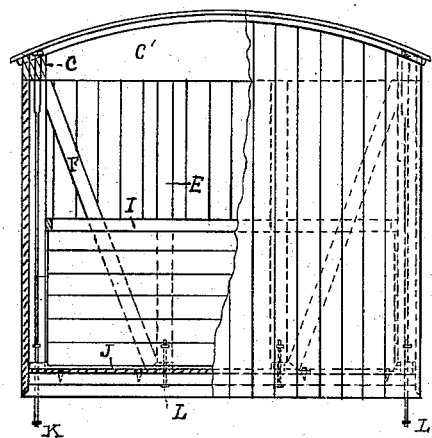
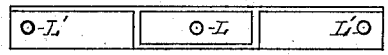 
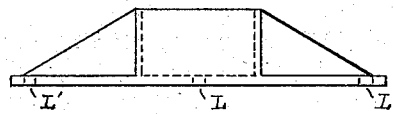 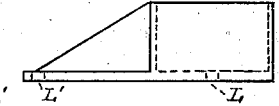
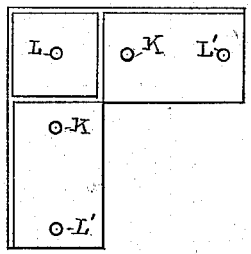
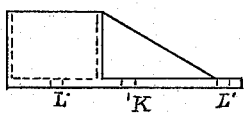
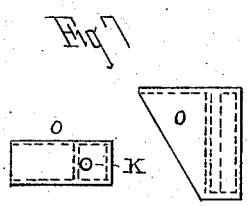
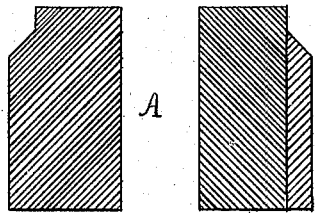
Witnesses
Frank P. Kinsey
Samuel T. O'Kinsey
Inventor
John P. Maher
pr Thomas P. Kinsey
Atty
N. PETERS, Photo-Lithographer, Washington, D. C.

UNITED STATES PATENT OFFICE.

JOHN P. MAHER, OF READING, PENNSYLVANIA.

RAILWAY-CAR.

SPECIFICATION forming part of Letters Patent No. 251,787, dated January 3, 1882.

Application filed October 27, 1881. (No model.)

*To all whom it may concern:*

Be it known that I, JOHN P. MAHER, of the city of Reading, county of Berks, State of Pennsylvania, have invented a new and useful Improvement in the Mode of Car-Construction, of which the following is a specification.

This improvement is more particularly designed to facilitate the repairing and renewal of parts of a car, whereby the cost of maintenance is lessened and the extent and cost of repairs also greatly reduced.

Figure 1:
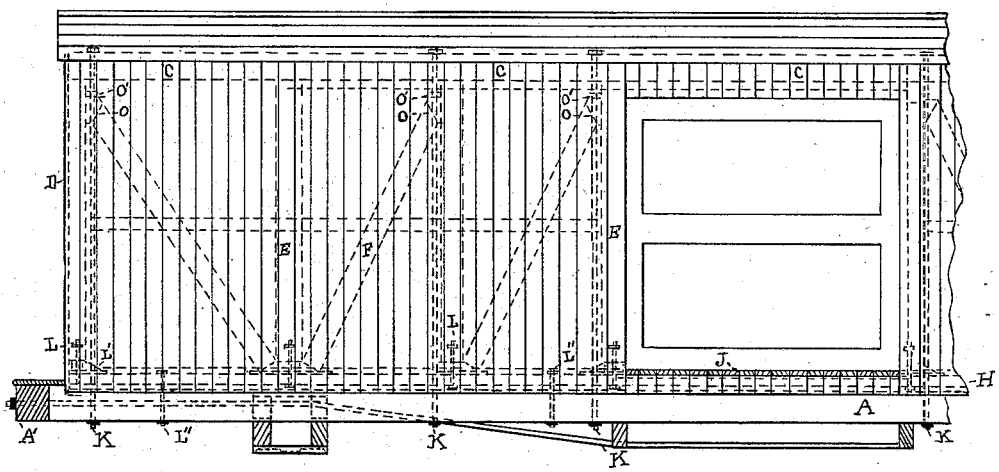
Figure 2:
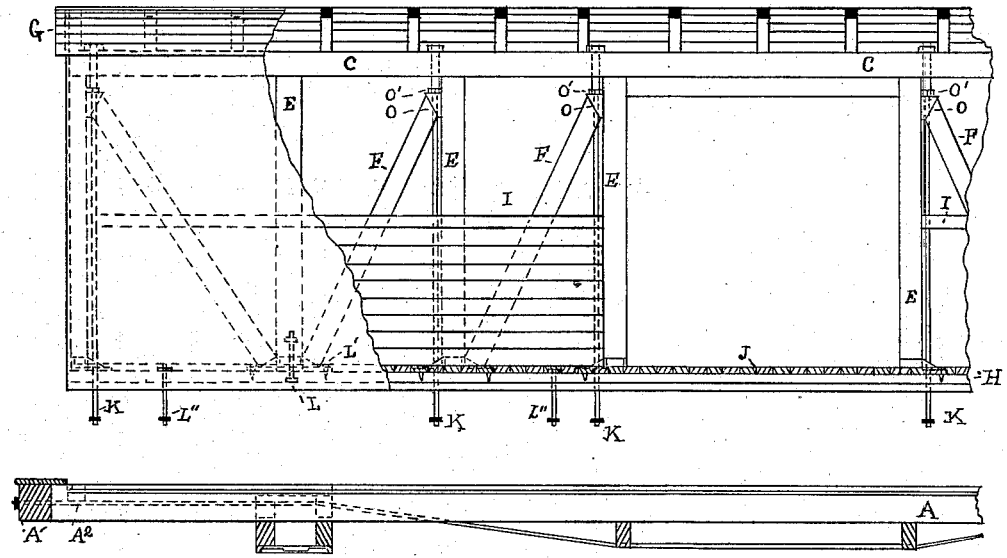

Referring to the drawings herewith, in which similar parts are designated by similar figures, Figure 1, Sheet 1, is a partial elevation of a car-body provided with my improvement; Fig. 2, Sheet 1, an elevation of the frame lifted clear of the sills; Fig. 3, Sheet 2, a cross-section through the center of the car, the frame shown lifted above the sills; Fig. 4, Sheet 2, plan and elevation of corner-post sill-plates; Fig. 5, Sheet 2, plan and elevation of the intermediate-post sill-plates, and of post and double-brace sill-plates; Fig. 6, Sheet 2, plan and elevation of the intermediate-post and brace sill-plates; Fig. 7, Sheet 2, plan and elevation of the brace-cap; Fig. 8, Sheet 2, cross-section of side sills, showing rabbet in solid and equivalent facing-piece, in all of which—

A represents the outside sills; A', the end sills; A², the inner end sills; B, the inside sills or floor-beams; C, the side-post caps; C', the end piece; D, corner-posts; E, the intermediate posts on both sides and ends; F, the braces; G, the roof-rafters. H are supplemental sills or floor-stringers; I, rails above the lining on the inside of the car; J, the floor of the car; K, tension-bolts passing through cap C, brace-cap O, body of frame, and sill A. L are wood-screws or joint-bolts; M, cast-iron seat-plates with sockets for the corner-posts; N, cast-iron sill-plates for door-posts; O, cast-iron caps for brace-tops; P, cast-iron sill-plates with sockets for intermediate posts and seats for braces.

As is well known by all who will have an interest in an invention of this character, car-repairing, particularly of freight-cars, is not only a tedious and destructive operation, but also a very expensive one. The principal breakage, and therefore the most frequently renewed portion of the car, is in the side and intermediate sills. The outer sills often require renewal independent of breakage, owing to rot setting in back of the siding from the racking of the same. By a general loosening up of the braces the nails in the si'ls are broken off, and the rain gets back between the siding and sill, to the injury of both.

In the cars as usually constructed it is customary to run a tension-bolt down from the cap through the body and sill, passing it between the brace and post at the point of contact between them, thereby very materially reducing the bearing-surface of the brace against the post, thus permitting more rapid destruction of the car from use than would occur were the bearing-surfaces not so reduced; and I have seen no cars in which a provision had been made to take up lost motion in the braces, and thus retain permanently the original form of the car-body, as far as I am aware, it being the invariable custom to nail the siding to the braces, as well as to the other portions of the frame.

I make no change in the construction or arrangement of the sills or base of the car, except that either by a facing-piece or by rabbeting out of the solid I form a seat entirely around the sided portion of the car on the sides; and where the end sills are exposed on the upper front edges of the same this seat is in depth the thickness of the siding or weather-boarding from the face of the sills, and the depth vertically I make about one inch from the top face of the sills. The base of the rabbet or the top edge of the facing-piece I make at an angle of forty-five degrees, which insures that no rain or moisture will be retained in the joint. Of the two modes of construction, I give preference to the rabbet formed in the solid sill.

Having prepared the car-sills as above and finished the frame in the usual manner, ready for the body, I lay upon the side, end, and intermediate sills the strips H H, not less than two and one-half inches thick, and of a width corresponding with the top face of the respective pieces upon which they are laid. At the proper points, as determined by the construction of the car, are set upon the exterior sills, H H, the cast-iron sill-seats M, N, and P. The posts, of the usual size, and having tenons only at their upper ends, and shorter between shoulders by the length due to the thickness of the seat-plates, are set in the seat-plate sockets, and have their tenons inserted and secured in the mortises of the caps C C'. The seat-plates are then secured to the sills H by wood-screws L' through the flanges of the same. Hooked clamp-irons are now driven into the posts D and E and the sills H, combining them as a whole. The skeleton is then raised above the framed sill-base A high enough to introduce the joint-bolts L from below, which are then screwed home into each several post and the clamp-irons knocked off, the frame being self-sustaining. It is then left down upon the sill-frame, and the braces F, with their caps O, are inserted in place. The tension-bolts K are threaded at each end, the upper end for a length equal to two inches over the distance from the top of the cap-nut to the top of the cap O, and is enlarged and threaded over its whole surface. This is done so that the main body of the bolt may pass through the nut O' and the hole in back of brace-cap O without interfering with either. After the enlarged portion reaches the nut O' the nut is run up on the thread until sufficient length of bolt is shown through the sill A for the sill-nut to fill. The cap and sill-nuts are then tightly screwed home. The nut O' is then run down upon the cap O, and also tightly screwed down. The framing is now complete, ready for the siding, floor, and lining. The floor may be laid previous to the siding of the car or subsequent thereto. In either case it is nailed through the floor J into the supplemental sills H, care being taken not to penetrate through into the sills A or B. The rail I and inside lining are attached in the usual manner. In placing the siding the lower ends of the boards are cut at an angle of forty-five degrees to fit the base of the rabbet, as described, and is nailed below to the sills H only, and the siding is also nailed to the posts D E and caps C C', but not to the braces F, which are left free in so far as that they are not nailed, but are retained in place between the lining and siding by the heel resting in the sill-plates P, and having the head in cap O adjustable vertically upon the bolt K by the nut O', threaded upon the enlarged portion K' of said tension-bolt. This permits at any time a readjustment of the braces to take up lost motion in the frame or to give camber to the sills; and this is done by entering the car and with a wrench upon the nut O' tightening up the same.

It will be evident from the description given and an inspection of the drawings on Sheet 1 that on loosening the sill-nuts from the tension-bolts K and any supplementary bolts, L'', which it may be found necessary to run through H and A, or H and B, respectively, that the top or body of the car may be lifted off of the sill-frame in its entirety, and that repairs may be made to the bed or body, simultaneously or independent of each other; or by having duplicate tops on hand damaged tops would be removed and replaced by the new or repaired tops, and the rolling stock would thus be kept in constant use; or in cases of sudden demand the cars may have their tops removed and temporary floors and sides placed upon the bed-framing, thus converting them into gondola or flat bottoms, as desired, or vice versa, and thus with a minimum of rolling stock preserve a maximum percentage of transportation facilities.

In repairing cars provided with my improvement, even should the top edge of the sills give out by weather-rot, the sill-frame could, as a whole, or either piece of same separately, be turned upside down, when, a new rabbet or new facing-piece being run along, the sill would be equal to another term of service.

I do not confine my improvement to freight-cars alone, as it is applicable to all rolling stock, but especially adapted to freight and passenger car work.

I am aware that cars have been constructed where the body of the car was independent of the running-gear frame, and that cars have been built in sections, so that in case of accident the entire car should not become wrecked; but all, so far as I know, previous to my improvement, were impracticable, whereas my system of construction is so simple and easily understood as to make it a practical success.

Having described my improvement, its advantages and mode of construction, I desire to secure by Letters Patent the following:

1. An independent car-body composed of the usual elements, to wit: corner-posts D, intermediate posts, E, braces F, caps C C', roof G, railing I, and the usual lining and siding, when provided with sill-plates M, N, and P, brace-caps O, and supplemental sills H, and joint-bolts L, whereby the frame is adapted to carry the floor J, and the body, as a whole, may be removed from or connected with the independent sill-frame A, as shown and described, and substantially for the purpose set forth.

2. The loose braces F, seated upon the sill-plates P, capped with the cap O, (which is provided with a tension-bolt guide-hole on its back,) secured in place and adjustable thereon by the nut O' on the enlargement K' of the tension-bolt K, for the purpose described, and substantially as shown.

JOHN P. MAHER.

Witnesses:
JOHN B. GRISSINGER,
THOMAS P. KINSEY.